(12) United States Patent
Tajika

(10) Patent No.: US 7,315,097 B2
(45) Date of Patent: Jan. 1, 2008

(54) POWER SAVING CONTROL METHOD AND DEVICE IN ELECTRONIC DEVICE, AND POWER SAVING ELECTRONIC DEVICE

(75) Inventor: Takahisa Tajika, Kato (JP)

(73) Assignee: Fujitsu Limited, Kawasaki (JP)

( * ) Notice: Subject to any disclaimer, the term of this patent is extended or adjusted under 35 U.S.C. 154(b) by 172 days.

(21) Appl. No.: 10/926,950

(22) Filed: Aug. 27, 2004

(65) Prior Publication Data

US 2005/0231870 A1   Oct. 20, 2005

(30) Foreign Application Priority Data

Apr. 20, 2004   (JP) ............... 2004-124686

(51) Int. Cl.
*H01H 35/00*   (2006.01)
*H02H 3/06*   (2006.01)
*H02H 9/08*   (2006.01)
(52) U.S. Cl. ............... 307/131; 361/93.4; 361/93.9
(58) Field of Classification Search ............... 361/93.4, 361/93.9; 307/131
See application file for complete search history.

(56) References Cited

U.S. PATENT DOCUMENTS 5,189,589 A * 2/1993 Marschall ............ 361/93.2
5,715,465 A * 2/1998 Savage et al. ............ 713/340
5,780,941 A * 7/1998 Pauve ............ 307/139
6,754,092 B2 * 6/2004 McDowell et al. ............ 363/89
7,209,335 B2 * 4/2007 Kanamori et al. ......... 361/93.1

FOREIGN PATENT DOCUMENTS

JP   11-275780   10/1999
JP   2002-125315   4/2002

* cited by examiner

*Primary Examiner*—Michael Sherry
*Assistant Examiner*—Michael Rutland-Wallis
(74) *Attorney, Agent, or Firm*—Staas & Halsey LLP

(57) ABSTRACT

A power saving control method includes providing a latch circuit that is supplied with current for operation from a power source even if a switch circuit is turned off, so that the switch circuit is controlled to be turned off when the latch circuit is in a latched state and turned on when the latch circuit is in an unlatched state, operating an automatic-reset operation switch so that a power off process in the main load circuit is performed and the latch circuit is turned into the latched state for turning off the switch circuit when the switch circuit is in the ON state, and operating the automatic-reset operation switch so that the latch circuit is turned into the unlatched state for turning on the switch circuit when the switch circuit is in the OFF state.

7 Claims, 9 Drawing Sheets

POWER SAVING CONTROL METHOD AND DEVICE IN ELECTRONIC DEVICE, AND POWER SAVING ELECTRONIC DEVICE

BACKGROUND OF THE INVENTION

1. Field of the Invention

The present invention relates to a method and a device for a power saving control in an electronic device such as a display device. The present invention also relates to a power saving electronic device such as a display device.

2. Description of the Prior Art

Recently, flat panel displays including an LCD and an organic electroluminescent display are often used for television sets or monitors (display devices) of personal computers. These monitors are usually supplied with electric power via an AC adapter unit. It is important challenge for a monitor to reduce a stand-by power.

Namely, when an AC adapter is used as a power source for a monitor, the primary side of the AC adapter, i.e., the AC line cannot be turned off by control of the monitor, so the stand-by power of the AC adapter itself cannot be reduced to zero.

Various techniques have been used for reducing power consumption at a secondary side in general electronic devices such as a monitor. In a typical example, a microprocessing unit (MPU) is used as a sub system within a monitor, and the MPU performs a power control during the stand-by period.

This power control includes, for example, stopping power supply to a monitor or a hard disk drive or reducing operating speed of a CPU (MPU) if a personal computer is not operated for a certain period.

In addition, a power supplying device is described in Japanese unexamined patent publication No. 2004-112913, which performs control so as to reduce oscillation frequency of a converter when it goes into a power saving mode.

However, according to the conventional power saving control method, an additional MPU for the power saving control performs the control. Therefore, even in a power saving mode or a stand-by mode, substantial power is consumed for the MPU to operate. Furthermore, since an additional MPU is necessary for the power saving control, it causes a more complicated circuit structure and an increase in cost.

On the other hand, a self holding switch, e.g., a self holding type push button switch, a slide switch, a rotary switch or the like may be used for controlling on and off of a power source for a monitor. In this case, when the switch is turned off, the power source side can be disconnected completely from the load side, and the state is kept mechanically so that power consumption during the stand-by period can be minimized. On the other hand, however, an outer shape of the switch may be large resulting in a large area of an operating panel of the electronic device. This is disadvantageous for downsizing the device.

Particularly, a monitor has a front panel around a screen such as a LCD panel, and the above-mentioned switch may be disposed at the front panel. Therefore, if the outer shape of the switch is large, a size of the front panel is required to be large. It is disadvantageous from a viewpoint of design, too. In addition, the use of the self holding switch makes it difficult to support an operation by a remote controller.

SUMMARY OF THE INVENTION

An object of the present invention is to provide a power saving control with a simple configuration without using an additional MPU for the power saving control, so that power consumption during a stand-by period is substantially reduced.

The control method according to one aspect of the present invention is a power saving control method for an electronic device that includes a main load circuit, an over current detection circuit for detecting over current that flows into the main load circuit and a switch circuit for cutting off load current supplied from an external power source to the main load circuit when the over current detection circuit detects the over current. The method includes the steps of providing a latch circuit that is supplied with current for operation from the power source even if the switch circuit is turned off, so that the switch circuit is controlled to be turned off when the latch circuit is in a latched state and turned on when the latch circuit is in an unlatched state, operating, when the switch circuit is in the ON state, an automatic-reset operation switch so that a power off process in the main load circuit is performed to turn the latch circuit into the latched state thereby to turn off the switch circuit, and operating, when the switch circuit is in the OFF state, the automatic-reset operation switch so that the latch circuit is turned into the unlatched state thereby to turn on the switch circuit.

Preferably, the latch circuit becomes the latched state for turning off the switch circuit when the over current detection circuit detects the over current.

An electronic device according to one aspect of the present invention includes a main load circuit, an over current detection circuit for detecting over current that flows into the main load circuit, a switch circuit for cutting off load current supplied from an external power source to the main load circuit when the over current detection circuit detects the over current, a latch circuit that is supplied with current from the power source even if the switch circuit is turned off, so as to operate for switching between a latched state and an unlatched state, the latched state turning off the switch circuit when the over current detection circuit detects the over current and the unlatched state turning on the switch circuit, and an automatic-reset operation switch. A power off process in the main load circuit is performed for turning the latch circuit into the latched state by operation of the operation switch when the switch circuit is in the ON state, and the latch circuit is controlled to be turned into the unlatched state by the operation of the operation switch when the switch circuit is in the OFF state and the main load circuit is not working.

In a preferred embodiment, the main load circuit includes a microprocessor that performs the power off process by the operation of the operation switch, and an OR circuit is provided for obtaining a logical OR between a detection signal that is produced when the over current detection circuit detects the over current and an off instruction signal that is produced by the microprocessor when performing the power off process, so that the off instruction signal delivered by the OR circuit switches the latch circuit.

According to the present invention, a power saving control can be performed by a simple structure without using an additional MPU for power saving control, and power consumption during the stand-by period can be reduced substantially.

Furthermore, a small operation switch can be used, which is advantageous for downsizing the electronic device as well as for easy support of an operation by a remote controller.

DESCRIPTION OF THE PREFERRED EMBODIMENTS

Hereinafter, the present invention will be explained more in detail with reference to embodiments and drawings.

First Embodiment

Figure 1:
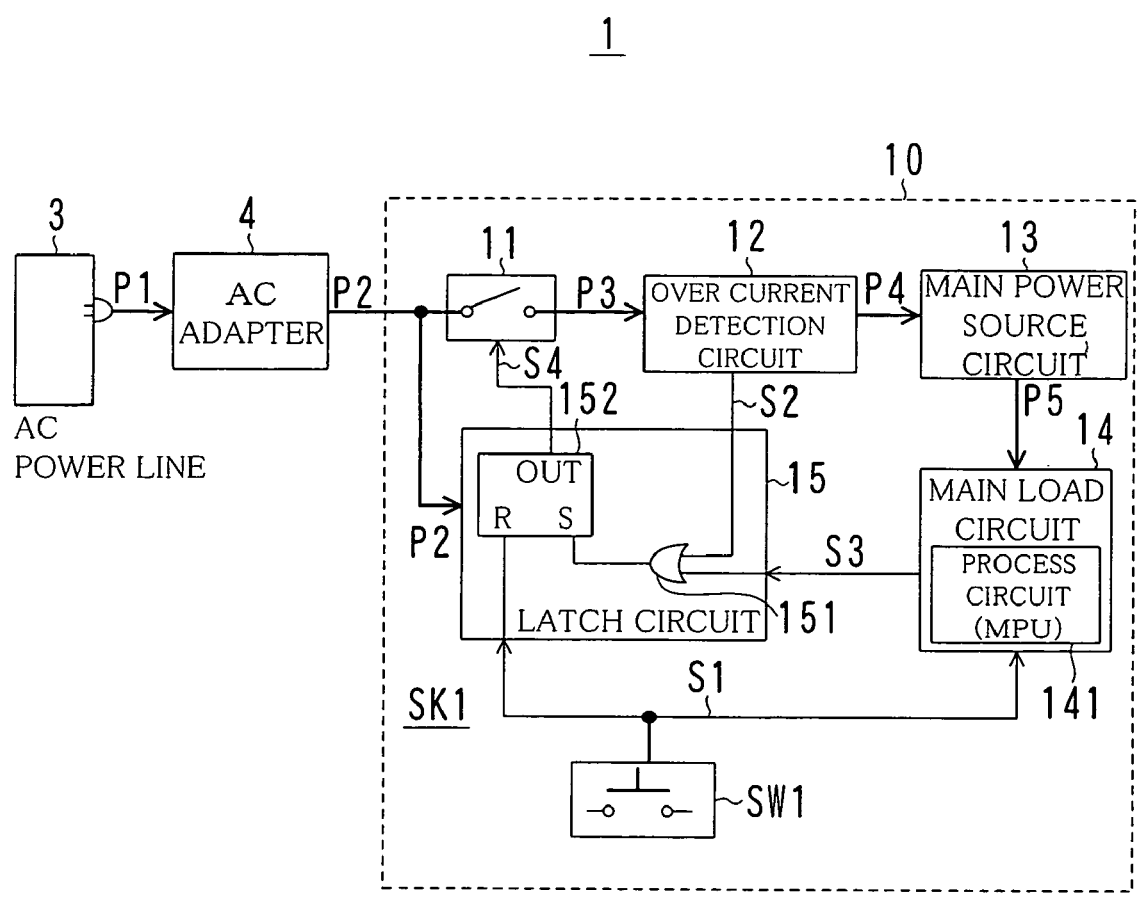
FIG. 1 is a block diagram showing functionally an overall structure of an electronic device including a power saving control circuit according to a first embodiment of the present invention.
Figure 2:
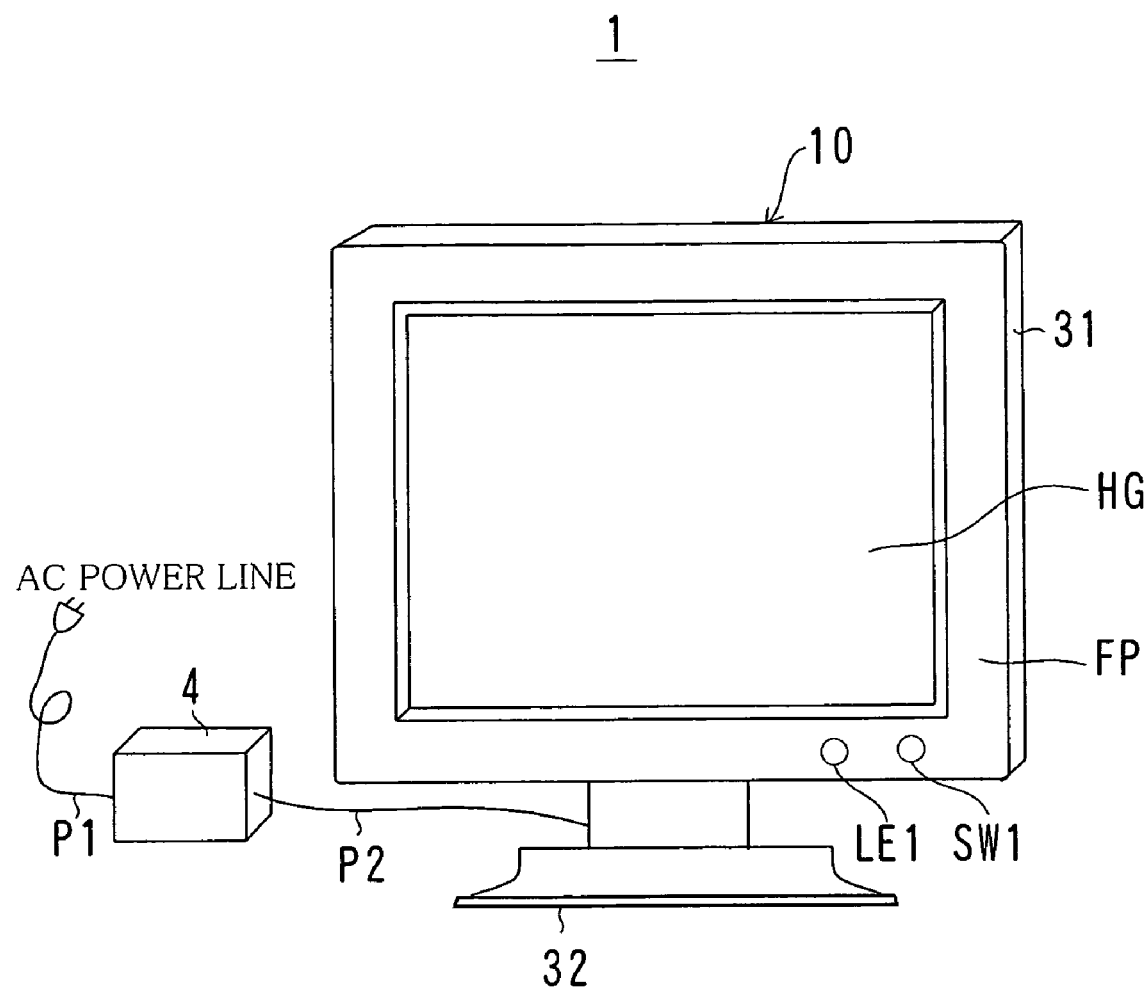
FIG. 2 is a perspective view showing an appearance of the electronic device.
Figure 3:
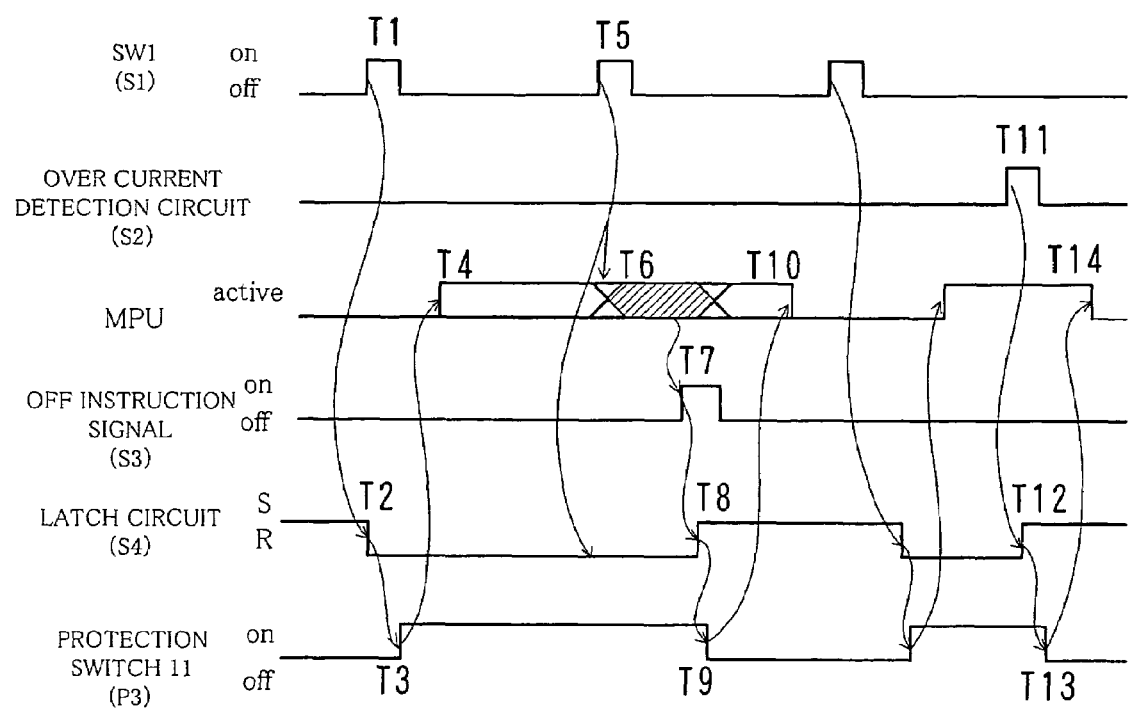
FIG. 3 is a timing chart showing mainly a power saving control operation of the electronic device.
Figure 4:
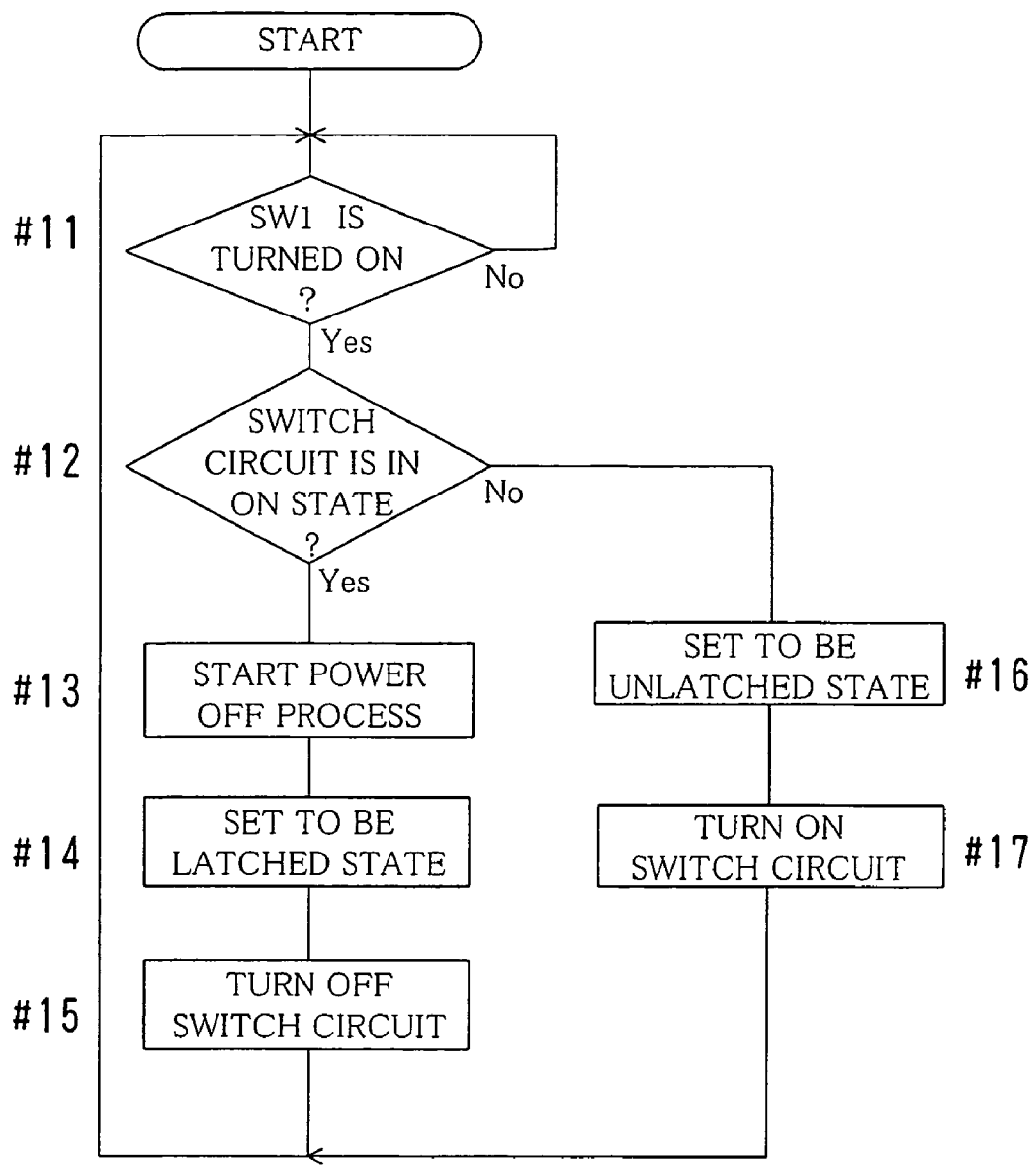
FIG. 4 is a flowchart showing a power saving control operation of the electronic device.
Figure 5:
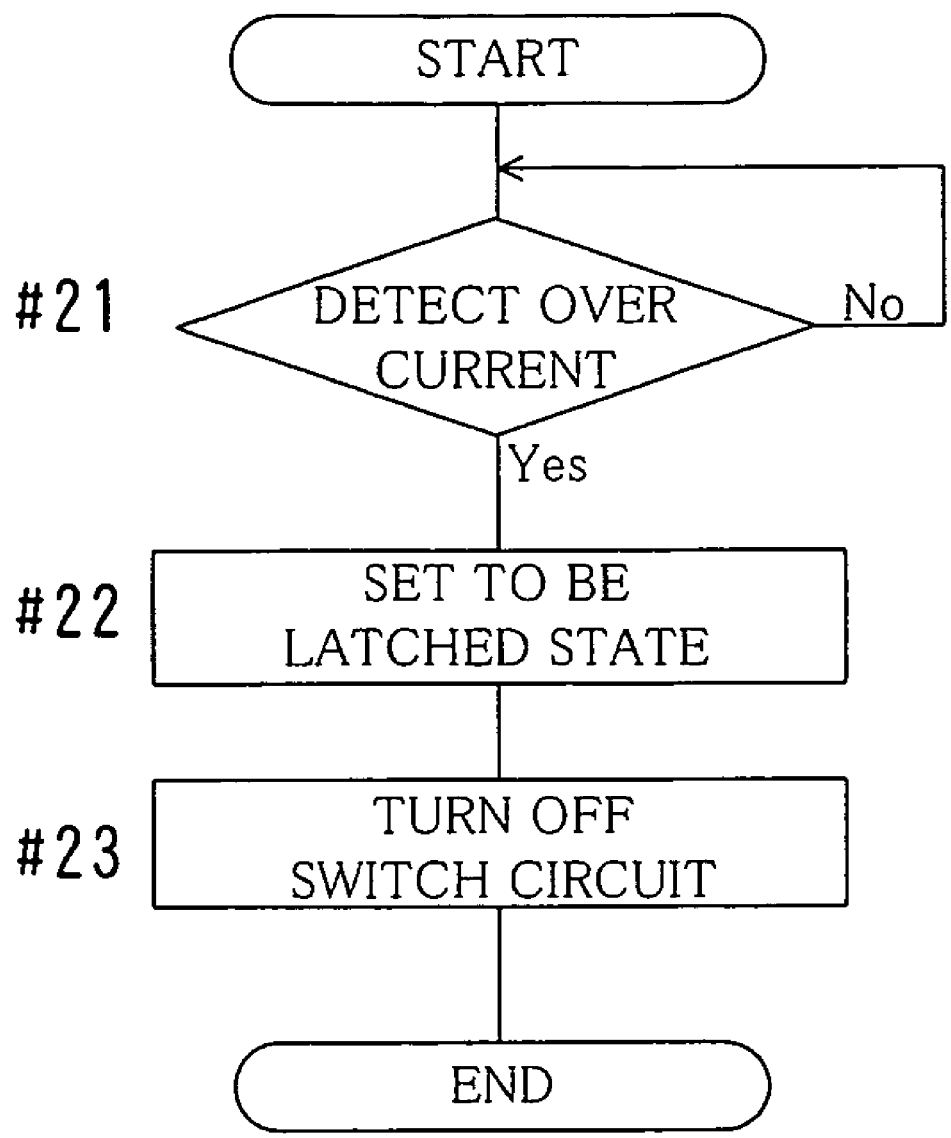
FIG. 5 is a flowchart showing an operation of the electronic device when detecting over current.

FIG. 1 is a block diagram showing functionally an overall structure of an electronic device 10 including a power saving control circuit SK1 according to a first embodiment of the present invention, FIG. 2 is a perspective view showing an appearance of the electronic device 10, FIG. 3 is a timing chart showing mainly a power saving control operation of the electronic device 10, FIG. 4 is a flowchart showing a power saving control operation of the electronic device 10, and FIG. 5 is a flowchart showing an operation of the electronic device 10 when detecting over current.

As shown in FIGS. 1 and 2, a whole system 1 includes an AC power line 3, an AC adapter 4, and an electronic device 10.

The AC power line 3 is a power source line of an alternating current connected to a normal power source, which supplies an AC power P1 of AC 100 volts, for example. The AC adapter 4 converts the AC power P1 supplied from the AC power line 3 into DC power P2 of an appropriate voltage for supply.

The electronic device 10 is a monitor used for a personal computer in this embodiment. As shown in FIG. 2, the electronic device 10 includes a display body portion 31 and its support device 32. The display body portion 31 includes a display screen HG such as an LCD panel and a front panel FP surrounding the display screen HG. An operation switch SW1 that operates ON/OFF of the power source and a display indicator LE1 that lights while the power is supplied are provided at the lower portion of the front panel FP.

With reference to FIG. 1 again, the electronic device 10 includes a switch circuit 11, an over current detection circuit 12, a main power source circuit 13, a main load circuit 14, a latch circuit 15, and the operation switch SW1 mentioned above.

The switch circuit 11 turns on and off the DC power P2 supplied from the AC adapter 4 that is an external power source. Namely, when the switch circuit 11 is turned on, the main power source circuit 13 and the main load circuit 14 are supplied with the DC power P2 so that the main load circuit 14 can perform a normal operation for its function. The switch circuit 11 can be an FET, a switching transistor, a thyristor, a relay or the like. When the switch circuit 11 is turned off, the power supply to the main power source circuit 13 and the main load circuit 14 is stopped. It is only the latch circuit 15 that is supplied with power when the switch circuit 11 is turned off. Note that DC powers P2, P3 and P4 have the same voltage.

In this way, the switch circuit 11 works as a main power source switch of the electronic device 10. In addition, the switch circuit 11 also works as a protection switch for protecting the electronic device 10 by disconnecting the main power source circuit 13, the main load circuit 14 and/or the like from the power source when over current flows into them.

The over current detection circuit 12 detects the over current that can flow into the main power source circuit 13 and/or the main load circuit 14. Namely, if current above a predetermined value flows into the main power source circuit 13, the main load circuit 14 and/or the like, the over current is detected and a detection signal S2 is produced.

The main power source circuit 13 receives the DC power P2 delivered from the AC adapter 4 and converts it into various voltages, which are supplied to each portion. The main load circuit 14 operates being supplied main power from the main power source circuit 13.

The main load circuit 14 includes a circuit of the LCD panel, a circuit for back light, a control circuit for them, a signal process circuit and an interface circuit in this embodiment. The main load circuit 14 includes a microprocessing unit (MPU) 141. The MPU 141 performs processes and controls for realizing functions of the electronic device 10 except for a so-called power saving control. Therefore, the MPU 141 stops its operation completely while a power saving control is performed in the electronic device 10.

The MPU 141 performs a power off process when the operation switch SW1 is operated, i.e., when an operational signal S1 is entered from the operation switch SW1 while the MPU 141 is working. The power off process of the MPU 141 is necessary for turning off the power supply to the electronic device 10 and includes a process for storing set data or environment data of a control state and an operational state at the time point into a storage device, and a process for turning off power supplies sequentially so that circuits and elements can be turned off safely. Thus, when the power is turned on the next time, initialization of the electronic device 10 is performed in accordance with the stored data so that the electronic device 10 can start its operation from the same state. This power off process itself is known well. In the final stage of the power off process by the MPU 141, an off instruction signal S3 is delivered from the main load circuit 14.

The latch circuit 15 switches between a latched state and an unlatched state in accordance with an input signal, and delivers a trip signal S4 in the latched state. When canceling the latched state to be the unlatched state, the trip signal S4 goes off.

Namely, the latch circuit 15 includes an OR circuit 151 and a latch portion 152. The OR circuit 151 receives the detection signal S2 and the off instruction signal S3. When either of the two signals is turned on, the latch portion 152 is set to be the latched state. In the latched state, the trip signal S4 is supplied. When the operational signal S1 is supplied from the operation switch SW1, the latch portion 152 is reset to be the unlatched state.

Therefore, when the main load circuit 14 delivers the off instruction signal S3, it is supplied to the OR circuit 151 so as to set the latch portion 152. Thus, the latch portion 152 becomes the latched state and delivers the trip signal S4. The trip signal S4 is supplied to the switch circuit 11, which becomes the OFF state. In this way, supply of the DC power P3 to the main power source circuit 13 and the main load circuit 14 is stopped. In this case, however, supply of the DC power P2 to the latch circuit 15 is maintained.

This state is the power-OFF state of the electronic device 10. In the power-OFF state, power is not supplied to any portion except the latch circuit 15, which is the only portion consuming power. However, the latch circuit 15 that has only a function of maintaining the off instruction signal S3 can be made up of a simple circuit including a transistor and consumes very little power.

The latch circuit 15 includes an OR circuit 151, which is supplied with a detection signal S2 from the over current detection circuit 12. Therefore, when the detection signal S2 is supplied, the latch portion 152 is set to be the latched state in the same way as the case when the off instruction signal S3 is supplied. Thus, the trip signal S4 is delivered so that the switch circuit 11 is turned off. Namely, when the over current detection circuit 12 detects the over current, the switch circuit 11 is cut off so that the main power source circuit 13 and the main load circuit 14 are disconnected from the DC power P2 of the power source side. Thus, the electronic device 10 is protected from breaking down or being over load so that serious situation does not occur. This operation itself for protecting from the over current is known well.

Note that though the over current detection circuit 12 is used in this embodiment, an over voltage detection circuit or an abnormal temperature detection circuit may be used instead of the over current detection circuit 12 or together with the same, so that the detection signal S2 is delivered for both the over current and the over voltage.

When the over current detection circuit 12 works and the switch circuit 11 is turned off, the state can be canceled as described below by operating the operation switch SW1 or by pulling out the connection portion of the AC adapter 4 on the AC power P1 side or the DC power P2 side for cutting of the power supply.

Next, with reference to the timing chart shown in FIG. 3, the power saving control in the electronic device 10 will be described.

First, an operation for turning on the power supply to the electronic device 10 when the electronic device 10 is not supplied with power will be described.

Namely, when the operation switch SW1 is operated to produce the operational signal S1 (T1), the operational signal S1 resets the latch portion 152 of the latch circuit 15 (T2) to be the unlatched state. Thus, the trip signal S4 is turned off so that the switch circuit 11 is turned on (T3). When the switch circuit 11 is turned on, the main power source circuit 13 is supplied with DC power P4 so that the main load circuit 14 is supplied with DC power P5 and performs a normal operation (T4).

Note that though the operational signal S1 is also supplied to the MPU 141 when the operation switch SW1 is operated, the MPU 141 performs no process at the time point because the main load circuit 14 is not supplied with power source and the MPU 141 is not working.

Next, when the operation switch SW1 is operated to produce the operational signal S1 while the main load circuit 14 is working (T5), the MPU 141 starts the power off process (T6). In the final stage of the power off process, the off instruction signal S3 is delivered (T7). When the off instruction signal S3 is delivered, the latch portion 152 is set (T8), so that the trip signal S4 turns off the switch circuit 11 (T9). Thus, supply of the DC power P3 to the main power source circuit 13 and the main load circuit 14 is stopped (T10).

In addition, when the detection signal S2 is delivered from the over current detection circuit 12 while the main load circuit 14 is working (T11), the latch portion 152 becomes the latched state (T12). Thus, the switch circuit 11 is turned off (T13), so that the main load circuit 14 and others are disconnected from the DC power P2 on the power source side (T14).

Next, with reference to flowcharts shown in FIGS. 4 and 5, the power saving control in the electronic device 10 will be described.

In FIG. 4, if the switch circuit 11 is in the ON state (Yes in #12) when the operation switch SW1 is turned on (Yes in #11), the MPU 141 starts the power off process (#13). Then, the off instruction signal S3 is delivered, so that the latch portion 152 is set (#14). Thus, the switch circuit 11 is turned off (#15), so that supply of the DC power P3 to the main power source circuit 13 is stopped.

In addition, if the switch circuit 11 is in the OFF state (No in #12) when the operation switch SW1 is turned on, the latch portion 152 is reset (#16) so that the switch circuit 11 is turned on (#17) and supply of the DC power P3 to the main power source circuit 13 is started.

In FIG. 5, when the over current detection circuit 12 detects the over current (Yes in #21) while the main load circuit 14 is working, the latch portion 152 is set (#22) so that the switch circuit 11 is turned off (#23).

According to the first embodiment described above, the power saving control can be performed by a simple structure without using an additional MPU for power saving control. As a result, power consumption during the stand-by period can be reduced substantially.

In addition, a small automatic-reset switch can be used as the operation switch SW1. For example, various types of small switches including a sheet switch and a film switch can be used, which works when a certain operation such pressing by a finger is done and recovers upon the operation is stopped. Therefore, it is advantageous for downsizing the electronic device 10. Especially, if the electronic device 10 is a monitor as this embodiment, the area of the front panel FP can be downsized by using the small operation switch SW1. Therefore, the entire of the monitor can be downsized, which is also advantageous from viewpoint of design.

Furthermore, a reception circuit for a remote control may be added to the latch circuit 15, so that a remote operation signal for ON/OFF of power supply is produced and used for making a logical OR with the operational signal S1 of the operation switch SW1. Thus, it is possible to support an operation by a remote controller. In addition, only the reception circuit for the remote controller is added that consumes power in the state where power is not supplied to the electronic device 10 in this case, so sufficient effect of power saving can be obtained.

Second Embodiment

Figure 6:
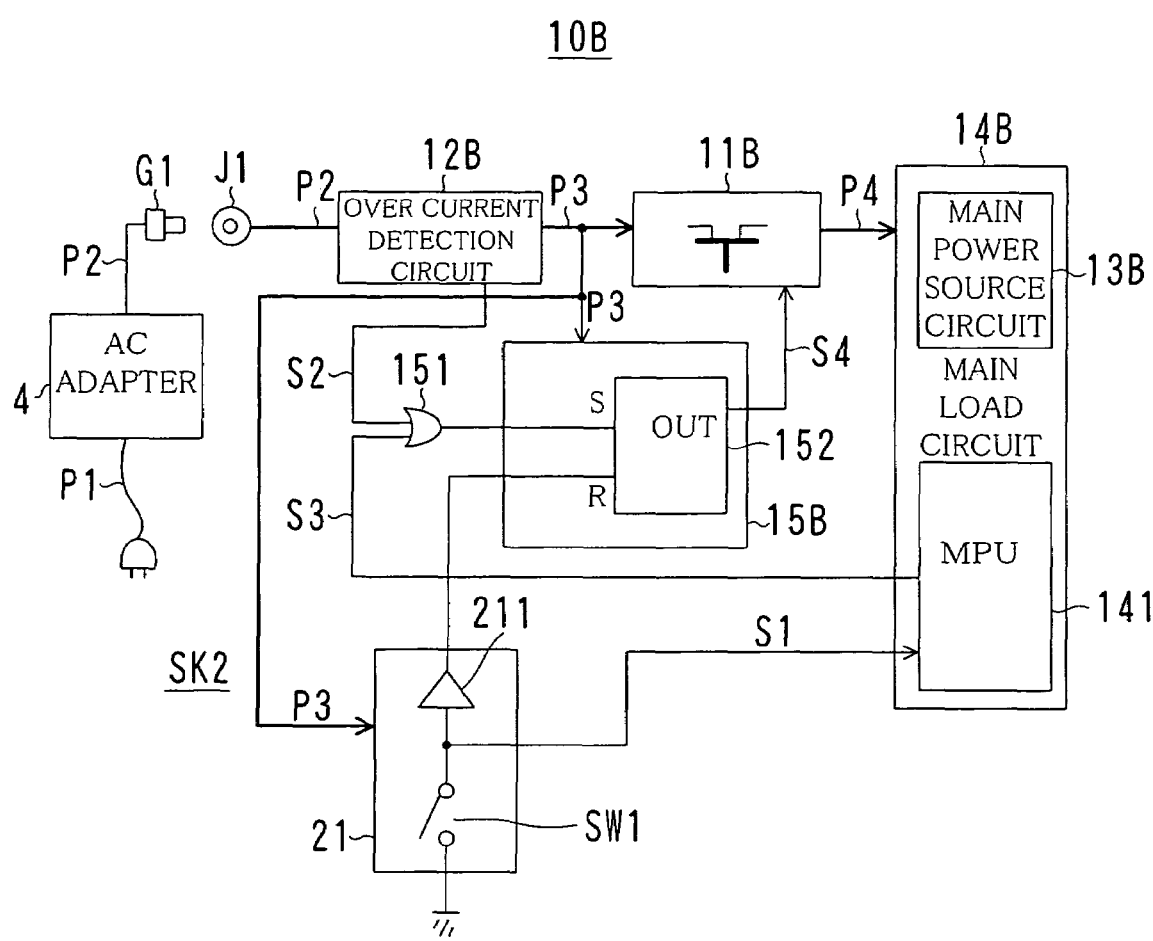
FIG. 6 is a block diagram showing functionally an overall structure of an electronic device including a power saving control circuit according to a second embodiment of the present invention.

FIG. 6 is a block diagram showing functionally an overall structure of an electronic device 10B including a power saving control circuit SK2 according to a second embodiment of the present invention.

In the second embodiment, the electronic device 10 shown in the first embodiment is described in a little more specifically, and the arrangement of the circuit is changed a little. However, basic functions are the same as the first embodiment, so explanation thereof can be referred to the description in the first embodiment.

In FIG. 6, the AC adapter 4 converts the AC power P1 supplied from the AC power line 3 into the DC power P2 of an appropriate voltage for supply. The electronic device 10B is connected by a plug G1 and a jack J1.

The electronic device 10B includes an over current detection circuit 12B, a switch circuit 11B, a main load circuit 14B, a latch circuit 15B, an operation circuit 21, and an OR circuit 151. The main load circuit 14B includes a main power source circuit 13B. The operation circuit 21 includes an operation switch SW1 and a buffer circuit 211.

The DC power P2 supplied from the AC adapter 4 is inputted to the over current detection circuit 12B and then to the switch circuit 11B. The over current detection circuit 12B can be a resistor having a resistance within the range from several hundred milliohms to several ohms. A transistor circuit may be provided that turns on when a voltage of the resistor exceeds a predetermined value.

When the operation switch SW1 is operated, the operational signal S1 is produced and is supplied to the MPU 141 as well as to a reset terminal of the latch portion 152 via the buffer circuit 211. The buffer circuit 211 is supplied with the DC power P2 regardless of ON/OFF of the switch circuit 11B.

The off instruction signal S3 delivered from the MPU 141 and the detection signal S2 delivered from the over current detection circuit 12B are both supplied to the OR circuit 151, and the output of the OR circuit 151 is supplied to the set terminal of the latch portion 152.

The power saving control of the electronic device 10B is the same as described in the first embodiment.

In the electronic device 10B of the second embodiment too, the power saving control can be performed by the simple structure without using an additional MPU for the power saving control.

Third Embodiment

Figure 7:
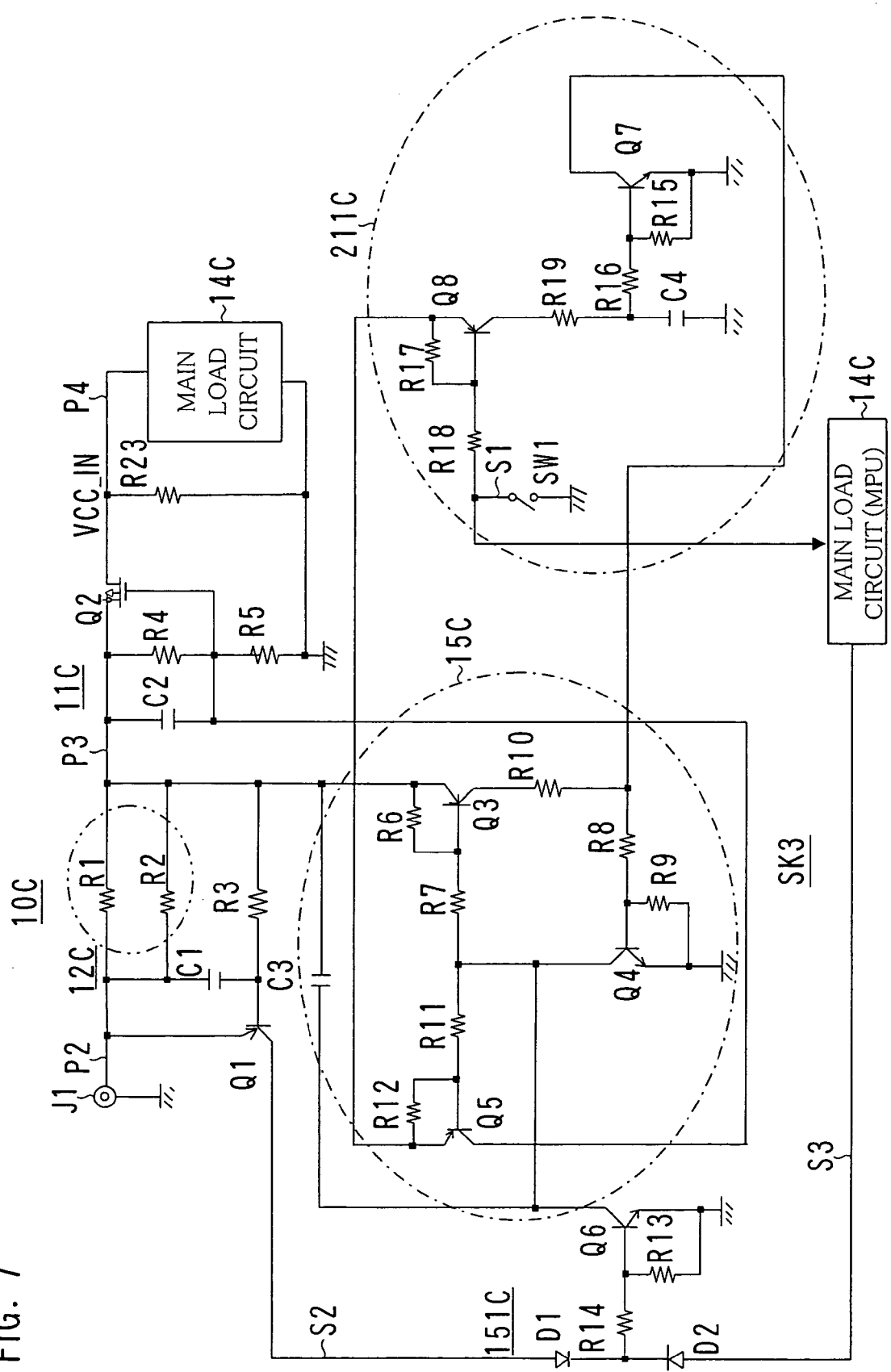
FIG. 7 is a block diagram showing functionally an overall structure of an electronic device including a power saving control circuit according to a third embodiment of the present invention.
Figure 8:
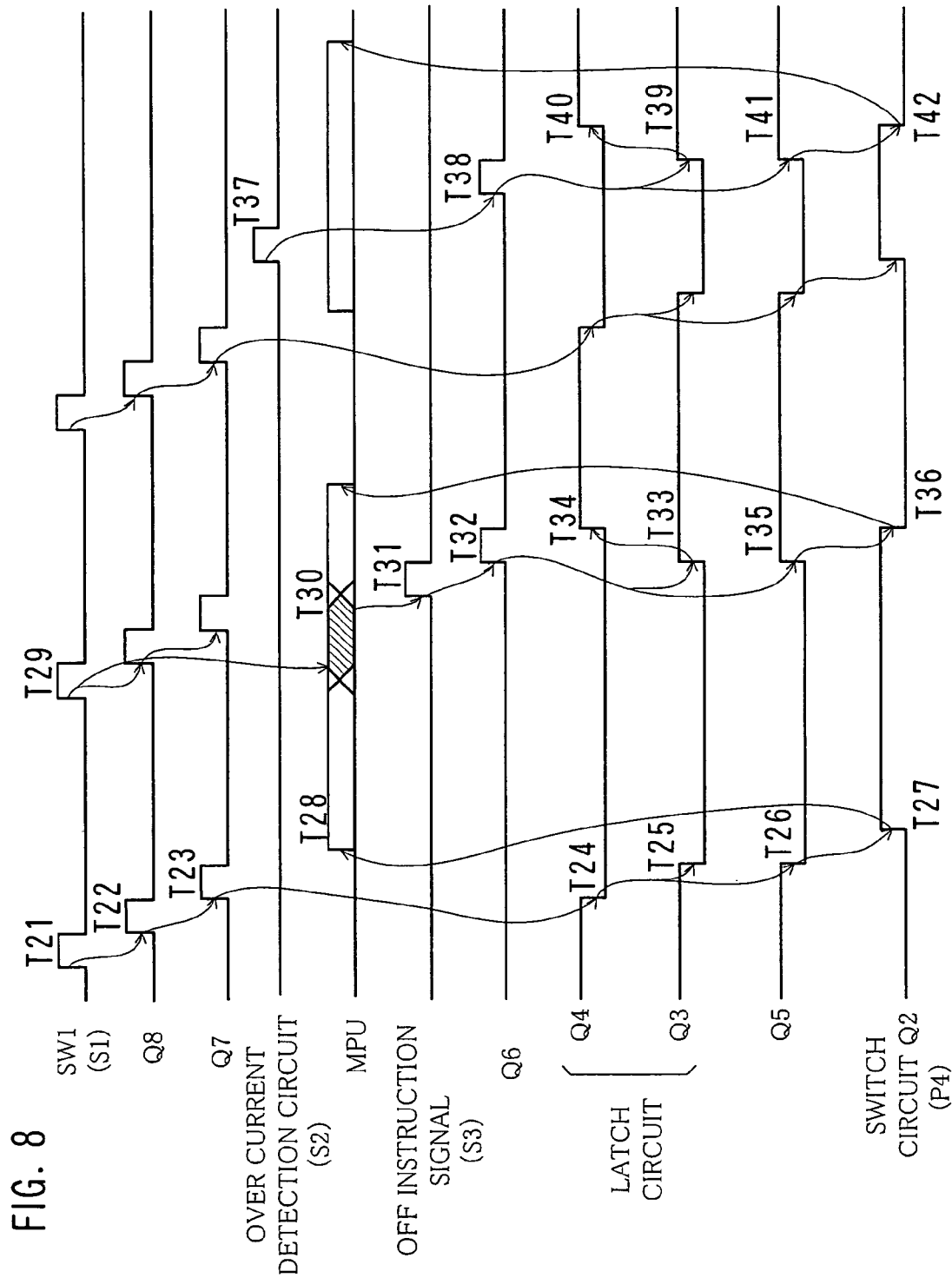
FIG. 8 is a timing chart showing a power saving control operation.
Figure 9:
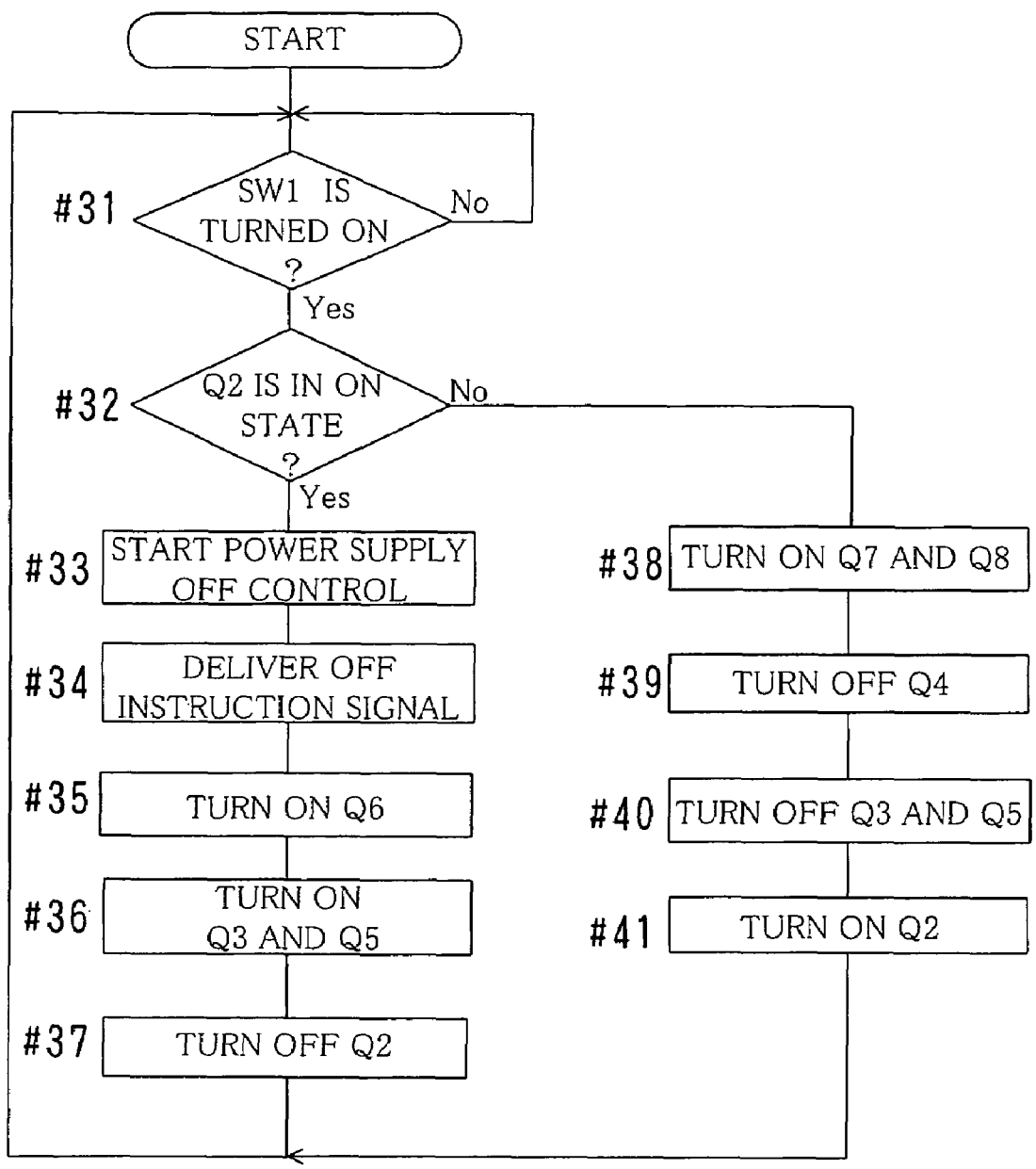
FIG. 9 is a flowchart showing a power saving control operation.

FIG. 7 is a block diagram showing functionally an overall structure of an electronic device 10C including a power saving control circuit SK3 according to a third embodiment of the present invention, FIG. 8 is a timing chart showing a power saving control operation of the electronic device 10C, and FIG. 9 is a flowchart showing a power saving control operation of the electronic device 10C.

In the third embodiment, the electronic device 10B shown in the second embodiment is described more specifically. However, basic functions are the same as the first or the second embodiment.

In FIG. 7, an over current detection circuit 12C includes two resistors R1 and R2, a transistor Q1, a resistor R3 and a capacitor C1 connected to a jack J1. A switch circuit 11C includes a switch element Q2, resistors R4 and R5, a capacitor C2, a transistor Q5 and resistors R11 and R12. An OR circuit 151C includes two diodes D1 and D2, resistors R14 and R13 and a transistor Q6.

A latch circuit 15C includes two transistors Q3 and Q4 and resistors R6-R1O. A buffer circuit 211C includes transistors Q7 and Q8, resistors R15-R18 and a capacitor C4.

In FIG. 8, when the operation switch SW1 is operated to connect one terminal of the resistor R18 to the ground (T21), then the transistor Q8 is turned on (T22), and further the transistor Q7 is turned on (T23). When the transistor Q7 is turned on, then the transistor Q4 is turned off (T24), and the transistor Q3 is also turned off (T25). Thus, the latch circuit 15C becomes the unlatched state.

When the latch circuit 15C becomes the unlatched state, then the transistor Q5 is also turned off (T26), and the switch element Q2 is turned on (T27). Thus, the main load circuit 14C is supplied with the DC power P4, so that the MPU 141 performs a normal operation (T28).

Next, when the operation switch SW1 is operated so as to produce the operational signal S1 (T29) while the main load circuit 14C is working, the MPU 141 starts the power off process (T30). As a result of the power off process, the off instruction signal S3 is delivered (T31). When the off instruction signal S3 is delivered, the transistor Q6 is turned on (T32). Then, the transistor Q3 is turned on (T33), and the transistor Q4 is also turned on (T34). Simultaneously, the transistor Q5 is turned on (T35), and the switch element Q2 is turned off (T36). When the transistor Q3 is turned on, then the transistor Q4 is turned on, and this state is maintained.

In addition, when the over current detection circuit 12C delivers the detection signal S2 (T37) while the main load circuit 14C is working, the transistor Q6 is turned on (T38), and the transistors Q3 and Q4 are turned on (T39 and T40). At the same time, the transistor Q5 is turned on (T41), and the switch element Q2 is turned off (T42).

In FIG. 9, if the switch element Q2 is in the ON state (Yes in #32) when the operation switch SW1 is turned on (Yes in #31), the MPU 141 starts the power off process (#33). As a result, the off instruction signal S3 is delivered (#34), and the transistor Q6 is turned on (#35). Then, the transistors Q3 and Q5 are turned on (#36), and the switch element Q2 is turned off (#37).

In addition, if the switch element Q2 is in the OFF state (No in #32) when the operation switch SW1 is turned on, the transistors Q7 and Q8 are turned on (#38). As a result, the transistor Q4 is turned off (#39). Then, the transistors Q3 and Q5 are turned off (#40), and the switch element Q2 is turned on (#41).

In this way, if the operation switch SW1 is operated while the main load circuit 14 is performing a normal operation, the process of the MPU 141 generates a dummy state like detecting over current and turns off the switch circuit 11C so that the power supply is stopped. Then, the state is maintained by the latch circuit 15C. In addition, if the operation switch SW1 is operated while the main load circuit 14 is not supplied with power, the latched state of the latch circuit 15C is cleared to be a dummy state like the over current is reset, in which the switch circuit 11C is turned on so as to connect the power source.

In the electronic device 10C, it is sufficient for the simple power saving control that the buffer circuit 211C, the process and the circuit for the off instruction signal S3 are added to the switch circuit 11C, the over current detection circuit 12C, and the latch circuit 15C that are typically provided as an abnormal latch circuit. Therefore, high cost performance is obtained.

In addition, a structure for controlling firmware is also very simple because power supply of the MPU 141 itself is cut off when the switch circuit 11C is turned off. It is also because monitoring for the power saving control is not necessary while the MPU 141 is working.

In this way, the power saving control can be performed by a simple structure without an additional MPU for the power saving control in the electronic device 10C of the third embodiment, too.

Though the operation switch SW1 is an a-contact type in embodiment described above, it can be a b-contact type or a c-contact type. The ON state of each of the signals may be either one (1) or zero (0). The circuit structures of the power saving control circuits SK1-SK3 and the electronic devices 10, 10B and 10C can be any one of other various circuit structures rather than described above.

Though the example using the external AC adapter 4 is described in the above embodiment, it is possible to dispose the AC adapter 4 inside the electronic device. In addition, though the example in which the AC adapter 4 delivers the DC power P2 is described, it is possible that the AC adapter 4 delivers AC power. Namely, the present invention can be applied to an electronic device that works by AC power in the same way as to the electronic device that works by DC power.

The present invention can be used for power saving control for reducing stand-by power of various electronic devices including a TV set, a personal computer and a monitor thereof.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A power saving control method for an electronic device including a main load circuit, an over current detection circuit detecting over current that flows into the main load circuit and a switch circuit cutting off load current, supplied from an external power source to the main load circuit, when the over current detection circuit detects the over current, the method comprising:

providing a latch circuit supplied with current for operation from the external power source even if the switch circuit is in an OFF state, and switching the switch circuit to the OFF state when the latch circuit is in a latched state and switching the switch circuit to an ON state when the latch circuit is in an unlatched state;

operating, when the switch circuit is in the ON state, a user actuable automatic-reset operation switch so that a power off process in the main load circuit is performed to turn the latch circuit into the latched state thereby to switch the switch circuit to the OFF state, switching off a supply of current for operation to the main load circuit and the over current detection circuit, the automatic-reset operation switch being capable of automatically recovering; and operating, when the switch circuit is in the OFF state, the user actuable automatic-reset operation switch so that the latch circuit is turned into the unlatched state, thereby switching the switch circuit to the ON state, switching on the supply of current for operation to the main load circuit and the over current detection circuit.

2. The power saving control method according to claim 1, wherein the latch circuit becomes the latched state for switching the switch circuit to the OFF state when the over current detection circuit detects the over current.

3. A power saving control device used in an electronic device including a main load circuit, an over current detection circuit for detecting over current that flows into the main load circuit and a switch circuit for cutting off load current supplied from an external power source to the main load circuit when the over current detection circuit detects the over current, the power saving control device, comprising:

a latch circuit, supplied with current from the external power source even if the switch circuit is in an OFF state, to switch between a latched state and an unlatched state, the latched state switching the switch circuit (to the OFF state) and switching off a supply of current for operation to the main load circuit and the over current detection circuit, and the unlatched state switching the switch circuit (to an ON state), switching on the supply of current for operation to the supplying main load circuit and the over current detection circuit; and a user actuable automatic-reset operation switch operated when the switch circuit is in the ON state so that a power off process in the main load circuit is performed to turn the latch circuit into the latched state, and for being operated when the switch circuit is in the OFF state to turn the latch circuit into the unlatched state.

4. A power saving electronic device, comprising:

a main load circuit;

an over current detection circuit detecting over current that flows into the main load circuit;

a switch circuit cutting load current supplied from an external power source to the main load circuit when the over current detection circuit detects the over current;

a latch circuit supplied with current from the external power source even if the switch circuit is in an OFF state, so as to operate and switch between a latched state and an unlatched state, the latched state switching the switch circuit to the OFF state, switching off a supply of current for operation to the main load circuit and the over current detection circuit, and the unlatched state switching the switch circuit to an ON state, switching on the supply of current for operation o the main load circuit and the over current detection circuit; and a user actuable automatic-reset operation switch, wherein:

a power off process in the main load circuit is performed for turning the latch circuit into the latched state by operation of the operation switch when the switch circuit is in the ON state and the main load circuit is receiving power, and the latch circuit is controlled to be turned into the unlatched state by the operation of the operation switch when the switch circuit is in the OFF state and the main load circuit is not receiving power.

5. The power saving electronic device according to claim 4, wherein:

the main load circuit includes a microprocessor that performs the power off process by operation of the operation switch, and an OR circuit is provided for obtaining a logical OR between a detection signal that is produced when the over current detection circuit detects the over current and an off instruction signal that is produced by the microprocessor when performing the power off process, so that the off instruction signal delivered by the OR circuit switches the latch circuit.

6. The power saving electronic device according to claim 4, wherein the electronic device is a display device, and the operation switch is disposed on a front panel adjacent a display screen.

7. The power saving electronic device according to claim 4, wherein the operation switch is provided with a buffer circuit, and the latch circuit is reset to the unlatched state via the buffer circuit when the operation switch is operated.

* * * * *

UNITED STATES PATENT AND TRADEMARK OFFICE
CERTIFICATE OF CORRECTION

PATENT NO. : 7,315,097 B2 Page 1 of 1
APPLICATION NO. : 10/926950
DATED : January 1, 2008
INVENTOR(S) : Takahisa Tajika It is certified that error appears in the above-identified patent and that said Letters Patent is hereby corrected as shown below:

Column 10, Line 33, change "o" to --to--.

Signed and Sealed this

Seventeenth Day of June, 2008

JON W. DUDAS
*Director of the United States Patent and Trademark Office*